United States Patent
Tamaru et al.

(10) Patent No.: US 7,184,185 B2
(45) Date of Patent: Feb. 27, 2007

(54) IMAGE-FORMING DEVICE AND SCANNING UNIT FOR USE THEREIN

(75) Inventors: Yasuo Tamaru, Nagoya (JP); Ryota Kato, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 41 days.

(21) Appl. No.: 11/186,860

(22) Filed: Jul. 22, 2005

(65) Prior Publication Data

US 2006/0017997 A1 Jan. 26, 2006

(30) Foreign Application Priority Data

Jul. 22, 2004 (JP) ............................. 2004-214197

(51) Int. Cl.
*G02B 26/08* (2006.01)

(52) U.S. Cl. ...................................... 359/204; 347/243

(58) Field of Classification Search ................ 359/204, 359/216; 347/243
See application file for complete search history.

(56) References Cited

U.S. PATENT DOCUMENTS

| 6,801,239 | B2 | 10/2004 | Nakahata |
| 6,829,001 | B2* | 12/2004 | Yamakawa ................... 359/206 |
| 6,873,466 | B2* | 3/2005 | Hama et al. ................. 359/216 |
| 2003/0234857 | A1 | 12/2003 | Nakahata |

FOREIGN PATENT DOCUMENTS

JP 2004021133 1/2004

* cited by examiner

*Primary Examiner*—Euncha P. Cherry
(74) *Attorney, Agent, or Firm*—Banner & Witcoff, Ltd.

(57) ABSTRACT

In an image-forming device, a plurality of laser beams is irradiated onto the reflecting surface of a polygon mirror so as to be obliquely incident thereon. A plurality of mixture preventing elements is provided for preventing a laser beam from mixing in optical paths for another light beams.

15 Claims, 6 Drawing Sheets

IMAGE-FORMING DEVICE AND SCANNING UNIT FOR USE THEREIN

BACKGROUND OF THE INVENTION

1. Field of the Invention

The present invention relates to an image-forming device and a scanning unit, and particularly to an image-forming device and a scanning unit including a polygon mirror or other deflecting means for scanning light beams, the polygon mirror having a plurality of reflecting surfaces on which a plurality of light beams is obliquely incident from different positions in a subscanning direction.

2. Description of the Related Art

In a laser printer or other electrophotographic image-forming device, a light source such as a semiconductor laser emits a light beam that is deflected by a polygon mirror or other deflecting means onto a photosensitive member, the surface of which has a uniform charge, so as to form an electrostatic latent image on the surface of the photosensitive member by scanning the light beam thereon. The latent image is subsequently developed into a visible image with toner, and the toner image is transferred onto a recording medium, such as a sheet of paper, to form an image on the recording medium.

Conventional image-forming devices form color images by superimposing toner images in the colors cyan (C), magenta (M), yellow (Y), and black (K) Color image-forming devices that employ the tandem system are provided with a plurality of image-carrying members (photosensitive drums or the like), one for each color. The surface of each image-carrying member is exposed by a light beam according to image data corresponding to each color image, forming a latent image that is subsequently developed with toner. The toner images of each color are then transferred sequentially and superimposed over one another on an intermediate transfer medium or a paper or other recording medium, thereby forming a color image.

The laser printer is one conventional example of an image-forming device that scans and exposes an image-carrying member. In this exposure process, a light-emitting unit of the laser printer, such as a semiconductor laser, emits a laser beam. When the laser beam, having divergent rays, passes through a collimator lens, the collimator lens converts the light beam into substantially parallel rays. In order to perform face tangle error correction, a cylindrical lens is provided to converge the light rays in a subscanning direction, guiding the light onto a polygon mirror that is rotating at a high speed. The light beam is reflected off the polygon mirror, passes through an optical scanning system having scanning lenses, and is scanned over the surface of the image-carrying member.

Japanese Patent Application Publication No. 2004-21133 describes a conventional optical scanning device provided with a plurality of image-carrying members, as in the tandem method described above (or a single image-carrying member scanned at different positions), that employs a single polygon mirror to deflect a plurality of light beams emitted from light-emitting means corresponding to each color. In this technology, the light-emitting means are disposed at different positions in the subscanning direction for emitting a plurality of light beams that are obliquely incident on reflecting surfaces of the polygon mirror. Optical elements such as reflecting members corresponding to each of the light beams reflected off the reflecting surfaces of the polygon mirror are provided for forming restricted optical paths for guiding the light beams to the corresponding image-carrying members in order to expose the surfaces of the image-carrying members.

However, there has been much demand in recent years to produce more compact image-forming devices, such as the tandem image-forming devices described above for forming color images using a plurality of image-carrying members (or a single, large image-carrying member). In the technology of Japanese Patent Application Publication No. 2004-21133 described above, a plurality of laser beams are irradiated obliquely onto a single reflecting surface of a polygon mirror and deflected therefrom, and the plurality of laser beams are appropriately reflected off corresponding optical elements such as reflecting mirrors so as to be guided to corresponding image-carrying members. Since a relatively large distance must be maintained between the reflecting surface of the polygon mirror and the reflecting mirrors or other optical elements, this technology does not contribute to the production of a more compact device.

SUMMARY OF THE INVENTION

In view of the foregoing, it is an object of the present invention to provide an image-forming device and a scanning unit that irradiate a plurality of light beams so as to be obliquely incident on a single reflecting surface of a polygon mirror, while achieving a more compact size.

In order to achieve the above and other objects, the present invention provides an image-forming device that includes a polygon mirror, a plurality of light sources, a plurality of optical reflecting systems, a plurality of image-carrying portions, and a plurality of mixture preventing elements. The polygon mirror is rotatable about a rotational axis extending in a subscanning direction, and has a plurality of reflecting surfaces. The plurality of light sources is aligned in the subscanning direction and irradiates a plurality of light beams onto one of the reflecting surfaces of the polygon mirror so as to be obliquely incident thereon. Each optical reflecting system includes at least one optical reflecting element, and the optical reflecting systems are disposed in one-to-one correspondence with the light sources, thereby defining a plurality of optical paths for the light beams. Each optical reflecting system receives a light beam reflected off the one of the reflecting surfaces of the polygon mirror. The plurality of image-carrying portions on which the light beams traveling along corresponding optical paths form latent images by scanning the respective image-carrying portions. Each mixture preventing element prevents a corresponding light beam from mixing in optical paths for another light beams. It should be noted that a plurality of mixture preventing elements are not necessarily be provided but a single mixture preventing element may suffice in preventing light beam mixture into another light beams.

Generally, when a light beam is incident on the reflecting surface of the polygon mirror, the light beam is converged in the subscanning direction on the reflecting surface for correcting face tangle error. However, after being deflected off the reflecting surface, the light beam diverges and expands to a beam diameter of a several millimeters at maximum. Hence, when a plurality of light beams is obliquely incident on a single reflecting surface and the distance between the reflecting surface and the optical reflecting systems which form an optical path corresponding to each light beam, is shortened in order to produce a more compact device, the light beam may be reflected off optical elements corresponding to other colors and be irradiated onto the image-carrying member for another color.

Since the image-forming device of the present invention includes one or a plurality of mixture preventing members for preventing the light beam reflected off the reflecting surface from entering the optical path of another light beam, the present invention prevents light beams from mistakenly entering the wrong optical path and reaching the wrong image-carrying member. With this construction, it is possible to shorten the distance between the polygon mirror and the optical elements constituting the optical reflecting systems, thereby achieving a more compact device.

Here, "mixture" is defined as a light beam that diverges and is partially deflected by the optical reflecting elements corresponding to another color, so that the light beam not only follows the intended optical path, but also enters and mixes with the optical path for another light beam. Further, each optical reflecting system can be formed of one or plurality of optical reflecting elements such as reflecting mirrors, but the optical elements are not restricted to mirrors.

It is preferable that each mixture preventing element be disposed between the polygon mirror and the optical reflecting element disposed in an initial position in each optical system. Here, the "initial position in each optical system" signifies the optical element disposed at an initial position after the optical path for each light beam has been separated. This does not include the case in which a large mirror is disposed directly after the scanning mirror for changing the optical path by reflecting all of the laser beams in the same direction, because disposing mixture preventing members at positions before optical paths for the plurality of laser beams are divided into separate directions is an efficient way of preventing beam mixing. More specifically, when the optical reflecting element disposed at the initial position in each optical reflecting system is a mirror that reflects only the corresponding light beam, the mixture preventing member can conceivably be disposed before this mirror. However, it is also conceivable that the mixture preventing effect can be obtained when the mixture preventing member is disposed before a large mirror, as described above, depending on the design.

In this case, the mixture preventing member may be configured of a light-blocking member having openings through which single laser beams pass, with the openings positioned such that the laser beams passing therethrough do not mix with optical reflecting systems corresponding to other laser beams. The openings can be formed in a slit shape so that the laser beam scanned in a main scanning direction can scan one line through the slitted opening. The light-blocking members can be molded with stainless steel or another metal, synthetic resin, or the like. It is also conceivable to configure the light-blocking members of an optical glass or the like that is coated to allow light beams to pass only through portions corresponding to the openings.

The lengths of the openings in the subscanning direction are substantially equivalent to one scan line worth in the main scanning direction, while the light-blocking members can be formed such that the diameter in the subscanning direction of a light beam spot formed on the image-carrying member is substantially the same across one scan line worth in the main scanning direction. Alternatively, the light-blocking member can be formed of a flat plate-shaped member such that the length of the opening in the subscanning direction is different in the center portion and the end portions in the main scanning direction. In this case, the length of the openings in the subscanning direction should be modified so that the spot diameter in the subscanning direction of a light beam that reaches the image-carrying member is substantially equal over one scan line worth in the main scanning direction.

This configuration allows the width of the light beam to be adjusted when passing through the opening so that the diameter of the beam spot formed by the light beam on the image-carrying member is not greatly different at the center portion and end portions in the main scanning direction. However, it is preferable that the shapes of the light-blocking members and openings are optimized to match the characteristics of the scanning lenses and the like.

It is also preferable that a mixture preventing member, such as a light-blocking member, be provided one for each light beam, in order that the diameter of the beam spot formed on the image-carrying member by the light beam does not change greatly among light beams. Here, it is possible to provide openings corresponding to at least two light beams in the same light-blocking member. When the image-forming device is configured to irradiate two light beams each on opposing sides of the polygon mirror, a light-blocking member having two openings can be provided one on each side of the polygon mirror. If the image-forming device is configured to irradiate four laser beams off a single reflecting surface of the polygon mirror, then a light-blocking member having four openings can be used.

It is also desirable to provide the image-forming device with a position adjusting mechanism for adjusting the positions of the light-blocking members because it is preferable to be able to finely adjust the positions of the openings when the wrong light beams are incident on these openings, in order to prevent the mixture of laser beams.

The mixture preventing members can be configured of mirrors having regions for reflecting light beams and regions for transmitting light beams and can be positioned so that only one light beam is reflected while all other light beams are transmitted. While it is very difficult to achieve a reflectance of zero using a non-reflective coating, occurrence of ghost images and the like can be prevented depending on the sensitivity of the photosensitive members being used, even if a small amount of the wrong light beams are reflected.

BRIEF DESCRIPTION OF THE DRAWINGS

The particular features and advantages of the invention as well as other objects will become apparent from the following description taken in connection with the accompanying drawings, in which:

FIG. 6(*b*) is a front view showing the mixture preventing element shown in FIG. 6(*a*).

DESCRIPTION OF THE EMBODIMENTS

A color laser printer according to an embodiment of the invention will be described with reference to the accompanying drawings. In the following description, the terms "upward", "downward", "upper", "lower", "above", "below" and the like will be used throughout the description assuming that the color laser printer is disposed in an orientation in which it is intended to be used. In use, the printer is disposed as shown in FIG. 1.

(1) Overall Structure of a Color Laser Printer

Figure 1:
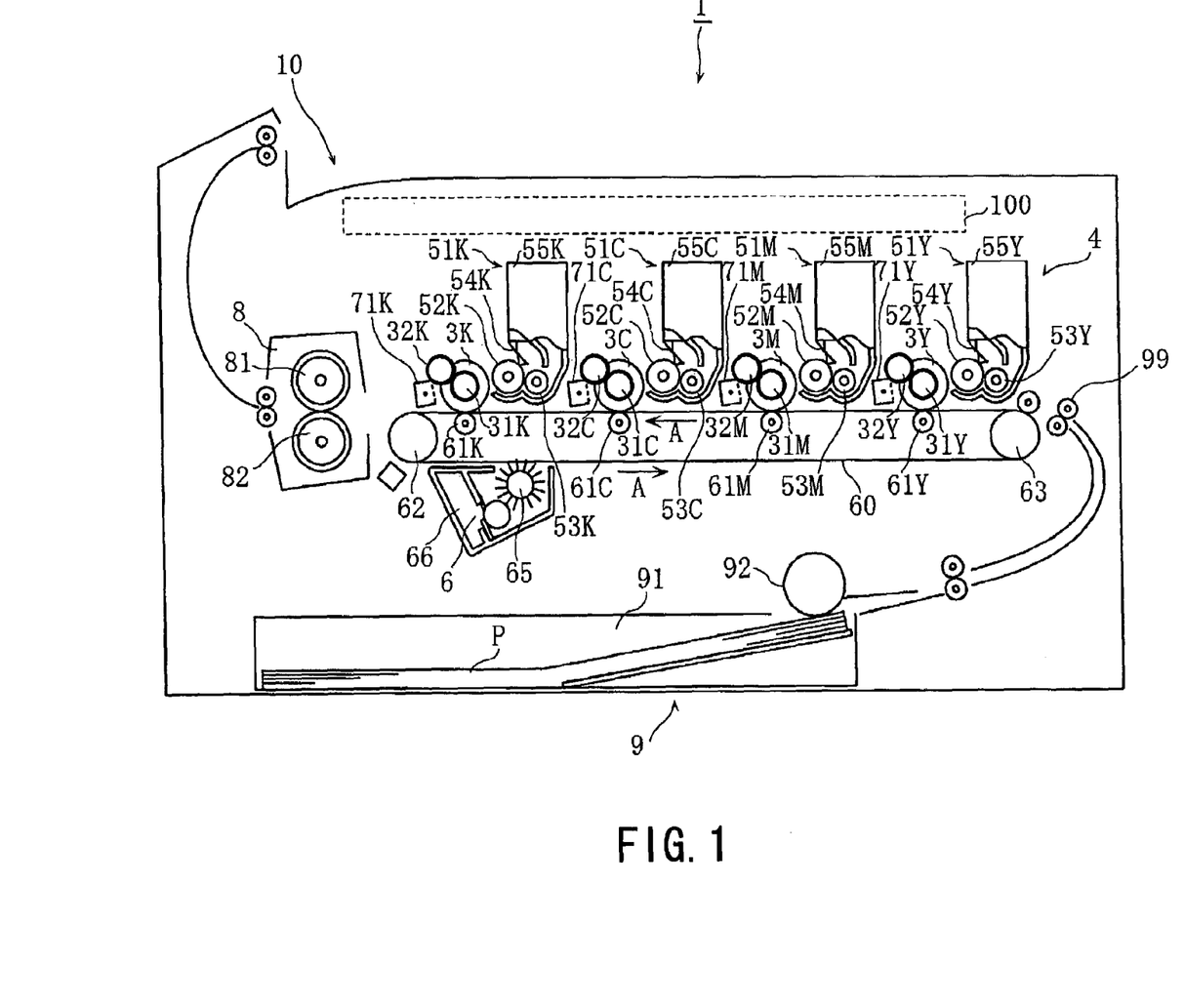
FIG. 1 is a vertical cross-sectional view showing a color laser printer as an example of an image-forming device.

FIG. 1 is a side cross-sectional view showing the structure of a color laser printer serving as the color image-forming device according to the present invention.

A color laser printer 1 is a tandem type color image-forming device for forming color images on a recording medium, such as a recording paper P. The color laser printer 1 includes photosensitive drums 3Y, 3M, 3C, and 3K (hereinafter also referred to as the "photosensitive drums 3") corresponding to the colors yellow (Y), magenta (M), cyan (C), and black (K). The photosensitive drums 3 sequentially superimpose toner images of their respective colors on the recording paper P, as the recording paper P is conveyed on a paper conveying belt 60.

The color laser printer 1 also includes a toner image forming unit 4, a fixing unit 8, a paper supplying unit 9, a paper discharge tray 10, and a scanning unit 100. The paper supplying unit 9 supplies sheets of the recording paper P to the toner image forming unit 4, and the toner image forming unit 4 forms color images on the recording paper P. Subsequently, the fixing unit 8 fixes the image to the recording paper P, and the recording paper P is discharged onto the paper discharge tray 10.

The paper supplying unit 9 is disposed in the bottommost section of the color laser printer 1 and includes a paper cassette 91 for accommodating the recording paper P or other recording medium, and a feeding roller 92 for conveying sheets of the recording paper P onto a paper conveying path. The feeding roller 92 is driven to supply the recording paper P at a prescribed timing synchronized with components in the toner image forming unit 4. The sheets of recording paper P supplied from the paper supplying unit 9 are conveyed onto the paper conveying belt 60 by a pair of conveying rollers 99.

The toner image forming unit 4 sequentially forms toner images in each color on the sheet of recording paper P supplied from the paper supplying unit 9 as the recording paper P is conveyed on the paper conveying belt 60. The paper conveying belt 60 is looped about a drive roller 62 and a follow roller 63. A drive motor (not shown) drives the drive roller 62 to rotate so that the paper conveying belt 60 moves in the direction indicated by an arrow A in FIG. 1. The toner image forming unit 4 is configured of separate units for each color that sequentially transfer images in their respective colors onto the recording paper P conveyed on the paper conveying belt 60 in order to form a color image thereon.

A cleaning unit 6 is disposed on the underside of the paper conveying belt 60. The cleaning unit 6 includes a scraping member 65 for scraping toner remaining on the surface of the paper conveying belt 60, and a residual toner case 66 for collecting toner scraped off the paper conveying belt 60 by the scraping member 65.

In addition to the photosensitive drums 3 mentioned above, the toner image forming unit 4 includes chargers 71Y, 71C, 71M, and 71K (hereinafter referred to as "chargers 71") and developing units 51Y, 51C, 51M, and 51K (hereinafter referred to as "developing units 51") in the corresponding toner image forming units corresponding to each of the toner colors yellow, magenta, cyan, and black. Hereinafter, the colors yellow, magenta, cyan, and black will be represented by the letters Y, M, C, and K, and components related to each color will have the letters Y, M, C, and K appended to their reference numeral to indicated the corresponding color.

The units of each color configuring the toner image forming unit 4 are arranged above the paper conveying belt 60 one after another beginning from the upstream side of the paper conveying path in order to form toner images in the order Y, M, C, and K.

Next, the structure of the units configuring the toner image forming unit 4 will be described. The photosensitive drums 3 are formed in a cylindrical shape of an aluminum base material, the surface of which is coated with a positive charging photosensitive layer. The aluminum base material functions as a ground layer. Gears 31Y, 31M, 31C, and 31K ("gears 31") are provided on side end surfaces of the photosensitive drums 3Y, 3M, 3C, and 3K, respectively, and are engaged with respective drive gears 32Y, 32M, 32C, and 32K ("gears 32") by which they are driven. The gears 32 for driving the gears 31 are driven by respective simple drive motors (not shown) to rotate simultaneously at the same angular velocity. Consequently, the photosensitive drums 3 are driven to rotate in the clockwise direction.

The chargers 71 are Scorotron chargers disposed below the respective photosensitive drums 3 so as to oppose but not contact the surfaces of the same. The chargers 71 form a uniform positive charge over the surfaces of the photosensitive drums 3. The developing units 51 have casings 55Y, 55M, 55C, and 55K ("casings 55") for accommodating toner. The developing units 51 also include respective developing rollers 52Y, 52M, 52C, and 52K ("developing rollers 52"), supply rollers 53Y, 53M, 53C, and 53K ("supply rollers 53"), and thickness regulating blades 54Y, 54M, 54C, and 54K ("thickness regulating blades 54").

The developing rollers 52 are cylindrical in shape and constructed of an elastic base material, such as a conductive silicon rubber or a conductive urethane rubber, the surface of which is coated with a resin or rubber material containing fluorine. The supply rollers 53 are formed of a conductive sponge roller and are disposed so as to contact the developing rollers 52 with pressure applied by the elastic force of the sponge roller. The supply rollers 53 may be configured of an appropriate foam member formed of a conductive silicon rubber, EPDM, or urethane rubber.

Each of the thickness regulating blades 54 has a base end formed of stainless steel or the like in a plate shape that is fixed to the respective casing 55, and a free end formed of an insulating silicon rubber or an insulating rubber or synthetic resin containing fluorine. The free end of the thickness regulating blades 54 contacts the respective developing roller 52 with pressure.

The supply rollers 53 in the developing units 51 supply toner accommodated in the respective casings 55 to the respective developing rollers 52. The thickness regulating blades 54 regulate the toner on the surfaces of the developing rollers 52 so that a uniform thin layer is carried thereon. Hence, after the scanning unit 100 forms electrostatic latent images on the surfaces of the photosensitive drums 3 by scanning a laser beam over these surfaces, the developing rollers 52 develop the electrostatic latent images with toner according to a reverse developing method.

The color laser printer 1 also includes transfer rollers 61Y, 61M, 61C, and 61K ("transfer rollers 61") disposed below the respective photosensitive drums 3 and on the inside of the paper conveying belt 60 so that the paper conveying belt 60 is interposed between the photosensitive drums 3 and the transfer rollers 61. The transfer rollers 61 apply a transfer bias that causes toner images developed on the surfaces of the photosensitive drums 3 to be transferred sequentially onto the sheet of recording paper P conveyed on the top surface of the paper conveying belt 60.

The fixing unit 8 is provided with a heating roller 81, and a pressure roller 82 disposed so as to contact the entire length of the heating roller 81 with pressure. After toner images in each color Y, M, C, and K have been transferred onto the sheet of recording paper P, the heating roller 81 fixes the toner images to the recording paper P with heat as the recording paper P passes between the heating roller 81 and pressure roller 82. After passing through the fixing unit 8, the recording paper P is discharged onto the paper discharge tray 10 provided on the top surface of the color laser printer 1.

(2) Structure of the Scanning Unit 100

Figure 2:
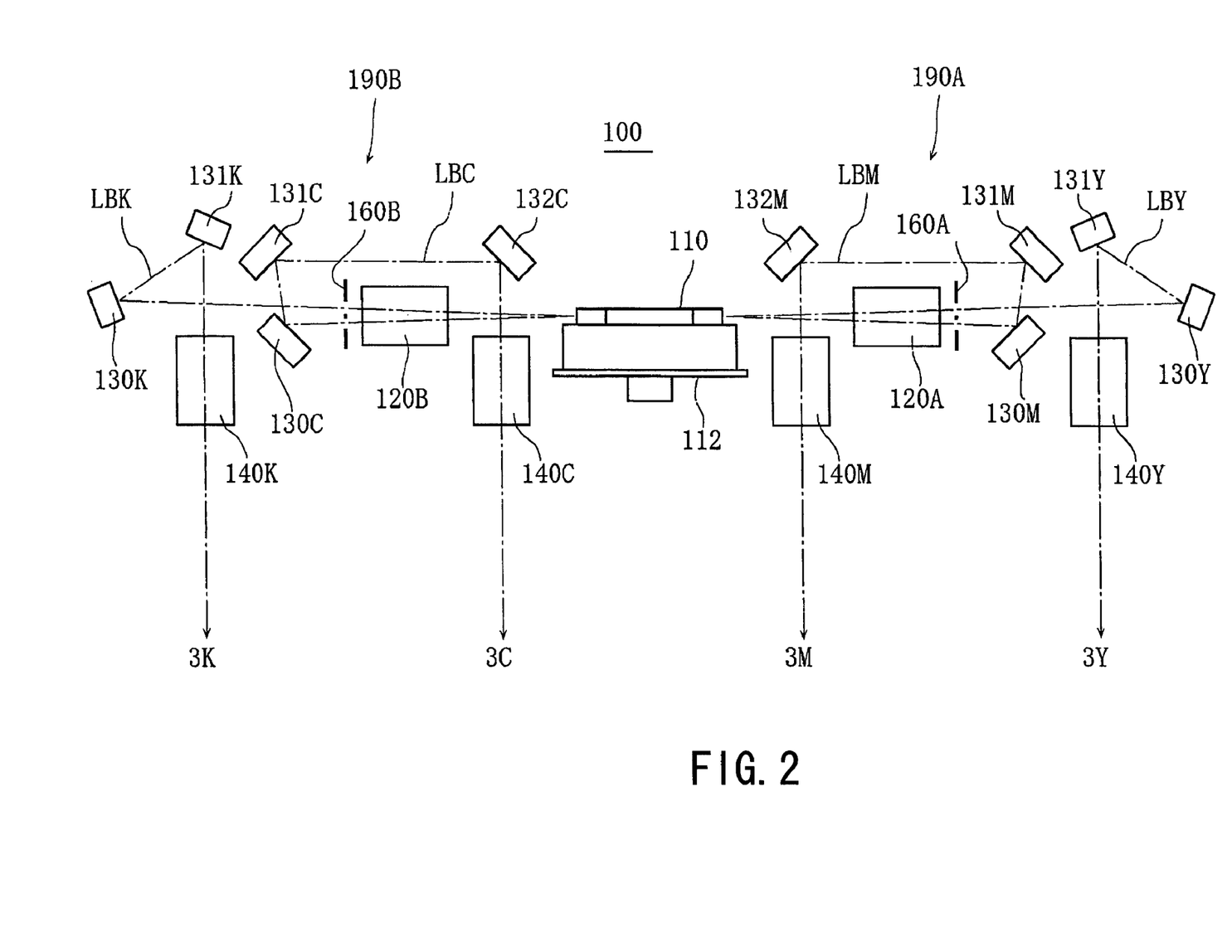
FIG. 2 is an explanatory side view showing a scanning unit according to an embodiment of the invention.

Next, the structure of the scanning unit 100 according to the preferred embodiment will be described. FIG. 2 is a side view showing the structure of the scanning unit 100.

The scanning unit 100 is configured of various components, such as those shown in FIG. 2, that are mounted on a frame (not shown) formed of a molded resin.

Figure 3:
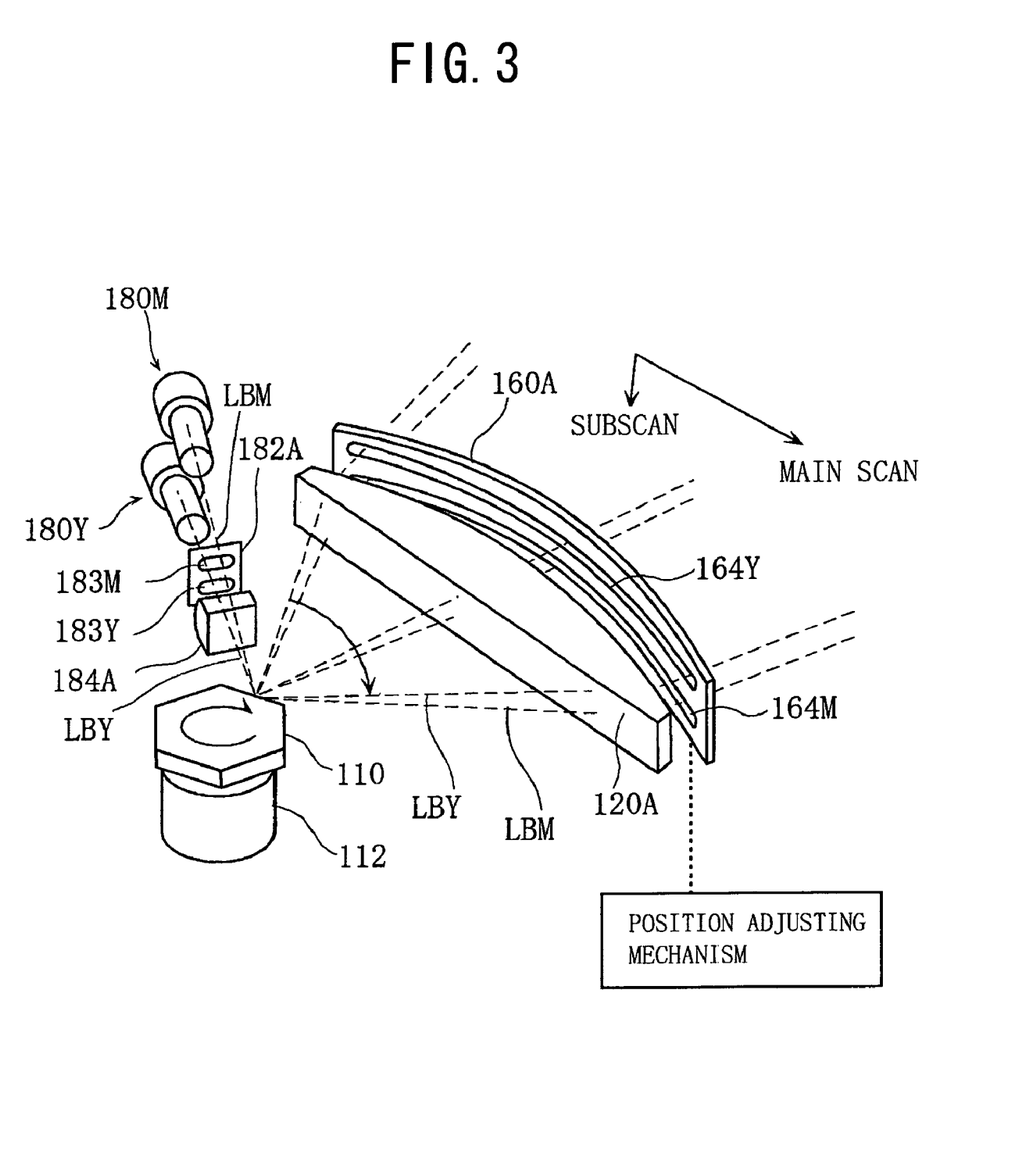
FIG. 3 is a perspective view showing a part of the scanning unit shown in FIG. 2.

The scanning unit 100 has a plurality (six in this example) of reflecting surfaces. A polygon mirror 110 is disposed in the central region of the scanning unit 100 with respect to the horizontal. A polygon motor 112 is provided for driving the polygon mirror 110 to rotate at a high speed. As shown in FIG. 3, light-emitting units 180 are disposed two on each side of the polygon mirror 110, each of which emits a laser beam from different positions in the sub-scanning direction so as to be obliquely incident on the surface of the polygon mirror 110.

An optical scanning system 190A corresponding to a laser beam LBY scanned over the photosensitive drum 3Y and a laser beam LBM scanned over the photosensitive drum 3M is disposed on the right side of the polygon mirror 110 in FIG. 2, while an optical scanning system 190B corresponding to a laser beam LBC for scanning the photosensitive drum 3C and a laser beam LBK for scanning the photosensitive drum 3K is disposed on the left side of the polygon mirror 110.

The optical scanning system 190A includes an fθ lens 120A, cylindrical lenses 140Y and 140M, and reflecting mirrors 130Y, 131Y, 130M, 131M, and 132M. The optical scanning system 190B includes an fθ lens 120B, cylindrical lenses 140C and 140K, and reflecting mirrors 130C, 131C, 132C, 130K, and 131K.

The fθ lenses 120A and 120B scan the respective photosensitive members at a constant speed while converging the laser beams in the main scanning direction. In the optical scanning system 190A, the lens 120A is shared by laser beams LBY and LBM. In the optical scanning system 190B, the lens 120B is shared by laser beams LBC and LBK.

In the preferred embodiment, the scanning unit 100 includes the cylindrical lenses 140 for each color in order to converge the respective laser beams in a subscanning direction, i.e., rotational direction of the photosensitive drums orthogonal to the main scanning direction. After reflecting off the surfaces of the polygon mirror 110 and passing through one of the fθ lenses 120A and 120B, the laser beams pass through the respective cylindrical lenses 140 provided for each color and strike the surfaces of the respective photosensitive drums 3. In addition, the reflecting mirrors 130, 131, and 132 are provided between the reflecting surfaces of the polygon mirror 110 and the cylindrical lenses 140 for each color as optical reflecting systems that form the optical paths of each laser beam. Specifically, the reflecting mirrors 130Y and 131Y form an optical path corresponding to yellow; the reflecting mirrors 130M, 131M, and 132M form an optical path corresponding to magenta; the reflecting mirrors 130C, 131C, and 132C form an optical path corresponding to cyan; and the reflecting mirrors 130K and 131K form an optical path corresponding to black.

(3) Mixture Preventing Members

When irradiating a plurality of laser beams obliquely onto the same reflecting surface of the polygon mirror 110, as in the scanning unit 100 of the preferred embodiment, the reflected laser beams must be appropriately guided to the optical path forming means of the corresponding color. For example, if the yellow laser beam LBY becomes mixed in with and incident on the optical path forming means forming the magenta optical path, the surface of the magenta photosensitive member will be mistakenly exposed, leading to a striking drop in image quality.

However, when laser beams for two colors, for example, are obliquely incident on a single reflecting surface in opposite directions with respect to the vertical, the angle formed by the two laser beams should be small in order to achieve good image quality. Generally, it is preferable that the angle be 3° or less. While the laser beams are normally converged when incident on the reflecting surfaces of the polygon mirror 110, the laser beams diverge again after being reflected. Hence, sufficient distance must be allocated between the reflecting surface of the polygon mirror 110 and the optical components constituting optical path forming means of each color in order to separate the laser beams appropriately. However, allocating such distance is detrimental to producing a compact device.

Therefore, in order to achieve a compact device in the preferred embodiment, the scanning unit 100 is provided with mixture preventing members 160A and 160B for preventing laser beams of each color from entering the optical paths of other colors. Both of the mixture preventing members 160A and 160B can be considered identical in structure and will simply be referred to as the mixture preventing members 160 unless it is necessary to distinguish them. Here, "mixing" refers to a laser beam of one color entering the optical path for a laser beam of another color, as described above.

FIG. 3 is an explanatory diagram showing a portion of the scanning unit 100 in the right half of FIG. 2 from a perspective diagonally above the polygon mirror 110 for illustrating the function of the mixture preventing member 160. Since the portion of the scanning unit 100 on the left side in FIG. 2 has the same configuration, this portion has been omitted from the drawing in FIG. 3.

In the scanning unit 100 shown in FIG. 3, a light-emitting unit 180Y for irradiating the yellow laser beam LBY and a light-emitting unit 180M for irradiating the magenta laser beam LBM are disposed in vertical juxtaposition. Each of the light-emitting units 180Y and 180M is provided with light-emitting elements (not shown) such as semiconductor lasers for emitting a laser beam modulated according to respective image data, and a collimator lens (not shown) for converting the divergent rays for the emitted laser beam into parallel rays.

A slitted plate 182A and a cylindrical lens 184A are disposed in front of the light-emitting units 180Y and 180M along the path of the emitted laser beams. The slitted plate 182A has two slits 183Y and 183M through which pass the laser beams LBY and LBM, respectively. The cylindrical lens 184A functions to converge the laser beams LBY and LBM in the subscanning direction on the reflecting surface of the polygon mirror 110. By irradiating the yellow laser beam LBY obliquely upward toward the polygon mirror 110 and the magenta laser beam LBM obliquely downward toward the polygon mirror 110, the laser beam LBY continues traveling upward after reflecting off the surface of the polygon mirror 110, while the laser beam LBM continues traveling downward.

The reflected laser beams LBM and LBY pass through the lens 120A and proceed toward the optical reflecting system of the corresponding color, as shown in FIG. 2. In the preferred embodiment, the mixture preventing member 160A is provided downstream of the lens 120A along the beam path, as shown in FIG. 3.

Next, the functions of the mixture preventing members 160 for preventing the mixture of laser beams will be described.

Figure 4A:
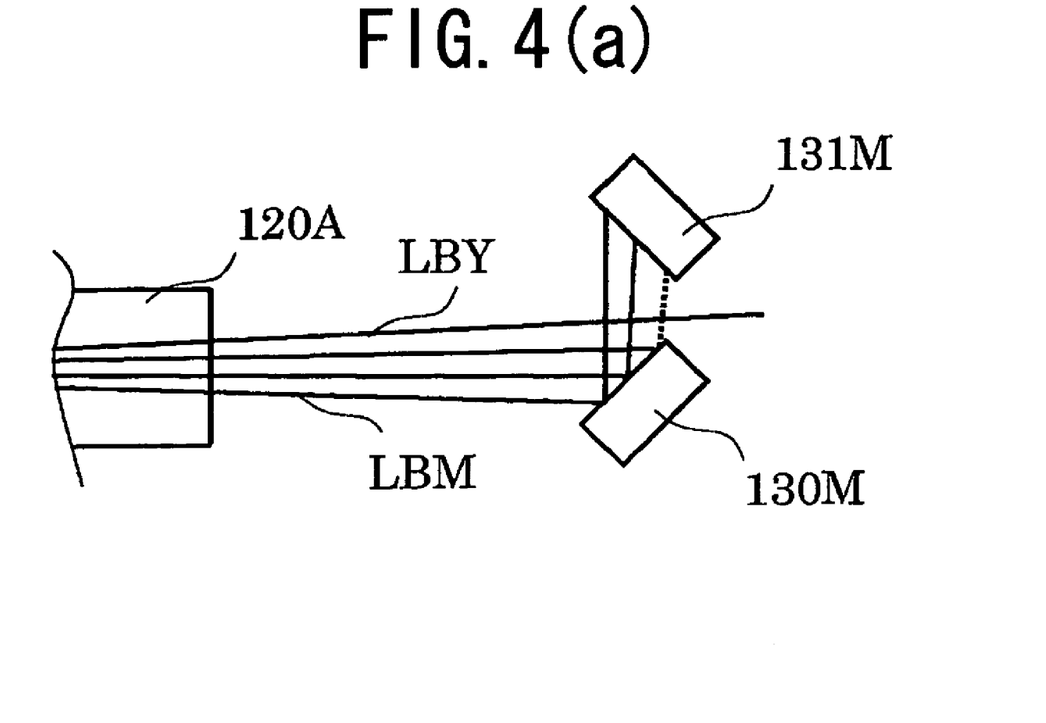
FIG. 4(a) is an explanatory diagram showing a part of the scanning unit wherein a mixture preventing element is not used.
Figure 4B:
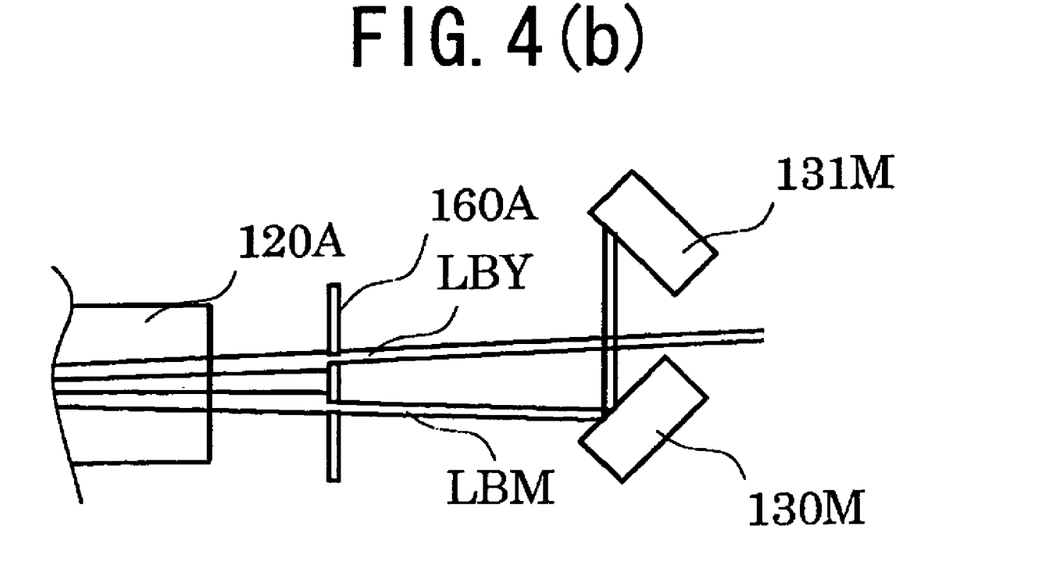
FIG. 4(b) is an explanatory diagram showing a part of the scanning unit wherein a mixture preventing element is used.

FIGS. 4(*a*) and 4(*b*) are explanatory diagrams illustrating how the mixture preventing members 160 prevent the mixture of laser beams.

FIG. 4(*a*) shows an optical scanning system that does not have the mixture preventing members 160. Here, after passing through the lens 120A, the laser beams LBY and LBM begin to diverge while proceeding toward the reflecting mirror 130M. If the distance between the lens 120A and the reflecting mirror 130M is short, then the distance between the laser beams LBY and LBM is also small at the reflecting mirror 130M. Accordingly, a portion of the divergent laser beam LBY is reflected off the reflecting mirror 130M. By disposing the mixture preventing member 160A in the optical scanning system, as shown in FIG. 4(*b*), the mixture preventing member 160A can prevent the laser beam LBY from reflecting off the reflecting mirror 130M.

Figure 5A:
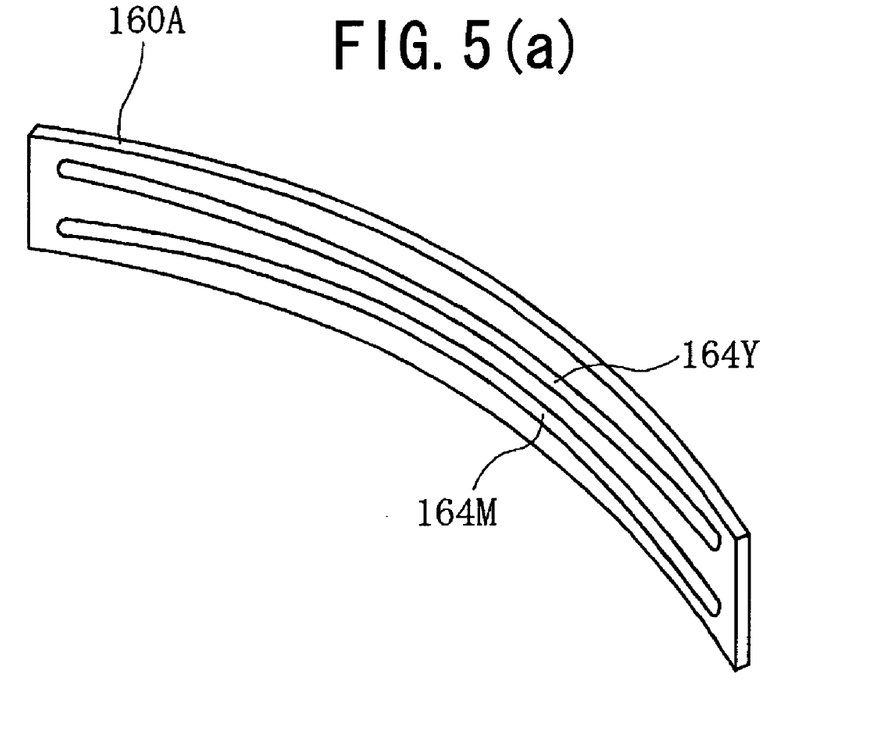
FIG. 5(a) is a perspective view showing the mixture preventing element according to one embodiment.
Figure 5B:
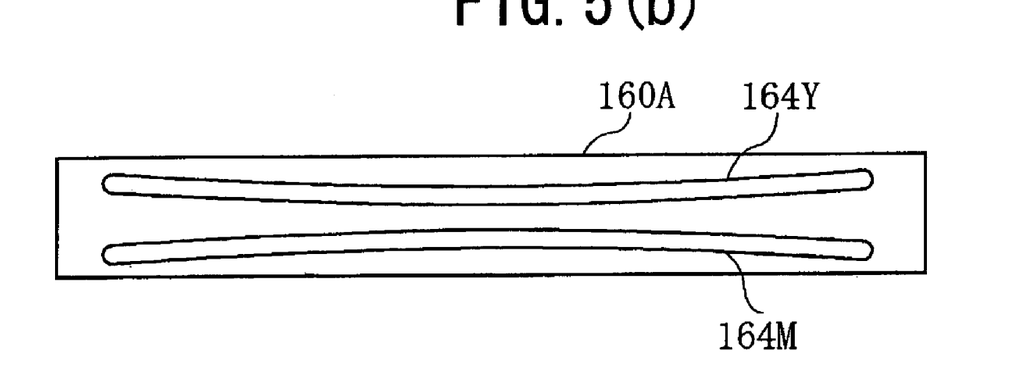
FIG. 5(b) is a front view showing the mixture preventing element shown in FIG. 5(a)

Next, the mixture preventing members 160 will be described in greater detail. FIG. 5(*a*) is a perspective view of the mixture preventing member 160A. FIG. 5(*b*) is a side view of the mixture preventing member 160A viewed from the lens 120A side. The mixture preventing members 160 is a light-blocking member configured of a plate formed of a synthetic resin, a metal, or the like. In the preferred embodiment, the mixture preventing member 160A is provided with slits 164M and 164Y through which the two laser beams LBM and LBY pass.

The function of the mixture preventing members 160 having these two slits is to reliably separate the optical paths of the two laser beams LBM and LBY so that the laser beam for one color does not reflect off optical elements in an optical reflecting system corresponding to a different color. Hence, only the laser beam LBY passes through the slit 164Y shown in FIG. 5(*b*), and only the laser beam LBM passes through the slit 164M. In this example, the lengths of the slits 164M and 164Y in the subscanning direction are equivalent to the lengths of the regions in which the laser beams are scanned in the main scanning direction (see FIG. 3). This is because the mixture preventing members 160 are bent in an arch shape to achieve an equal distance between the reflecting surface of the polygon mirror 110 and the slit 164Y and the like across the entire scanning region in the main scanning direction.

By adjusting the lengths of the slits 164 in the subscanning direction in this way, divergence of the laser beams (height of the laser beams in the subscanning direction) passing through the slits 164 is substantially equivalent over the entire scanning range in the main scanning direction, thereby suppressing variations in beam diameter and light intensity on the photosensitive members caused by use of the mixture preventing members 160. In the example of FIGS. 5(*a*) and 5(*b*), the slits are shaped to curve slightly from the central region in the main scanning direction toward the ends. This shape is intended to compensate for positional changes (curvature) in the subscanning direction of the laser beams passing through the slit 164Y and the like due to differences in the distance that the laser beam travels from the polygon mirror 110 to the lens 120A between the central portion and the end portions in the main scanning direction.

Figure 6A:
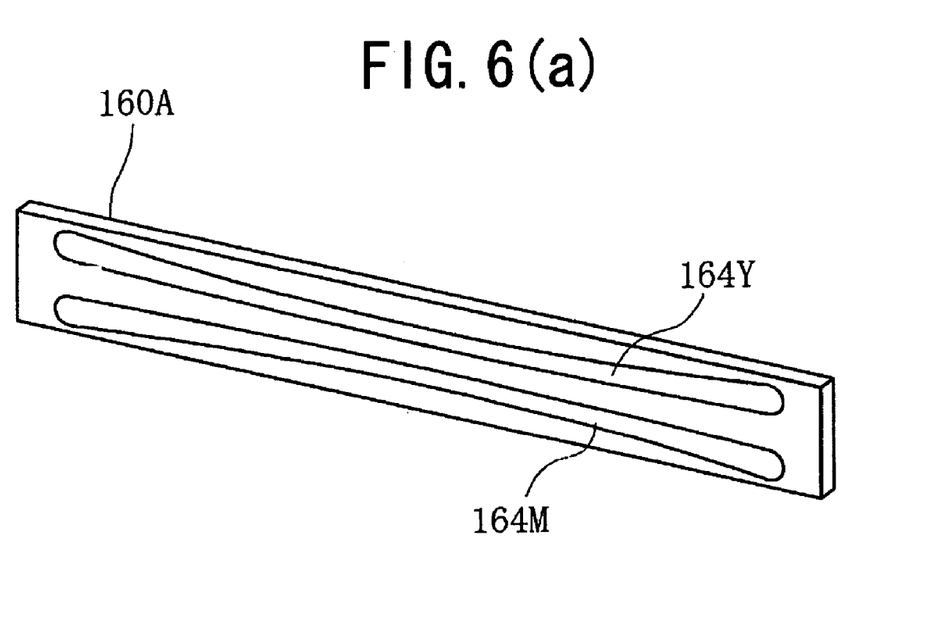
FIG. 6(a) is a perspective view showing the mixture preventing element according to another embodiment.
Figure 6B:
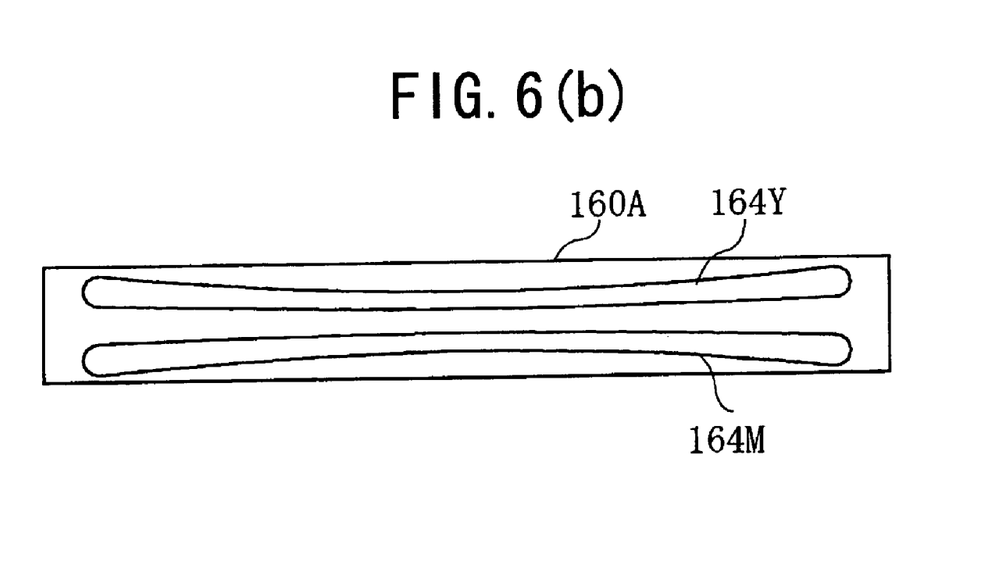

Obviously, the shape of the mixture preventing members, the shape of the slits formed in the mixture preventing members, the length of the slits in the subscanning direction, and the like can be and should be optimized along with the positions in which the mixture preventing members are disposed, based on the positions through which the laser beams pass and the beam spot widths formed on the photosensitive members and the like, as described above. For example, if the mixture preventing members 160 are formed of flat plate-shaped members, as shown in FIG. 6(*a*), then the shape of the slits can be adjusted according to the mounted positions and shapes of the mixture preventing members 160 and other conditions. For example, the slits can be formed gradually longer in the subscanning direction from the central region toward the ends in the main scanning direction, as shown in FIG. 6(*b*).

While the mixture preventing members 160 in the preferred embodiment described above are positioned relatively near the fθ lenses 120, the mixture preventing members 160 may also be disposed near the optical reflecting systems. Further, mixture preventing members having just one slit per member may be provided for each color. Further, the composition, shape, and arrangement of the mixture preventing members 160 may be varied according to the sensitivity of the photosensitive members. For example, when using highly sensitive photosensitive members, the angle at which the mixture preventing members 160 are disposed should be adjusted to prevent laser beams reflected off the mixture preventing members 160 from entering the optical paths of other colors. To this end, it is desirable to couple a position adjusting mechanism to an appropriate position on the mixtsure preventing member as shown in FIG. 3.

While the invention has been described in detail with reference to specific embodiments thereof, it would be apparent to those skilled in the art that many modifications and variations may be made therein without departing from the spirit of the invention, the scope of which is defined by the attached claims.

(1) In the scanning unit 100 of the preferred embodiment described above, the polygon mirror 110 is positioned in the horizontal center of the scanning unit 100 and laser beams are irradiated so that two laser beams are obliquely incident on the reflecting surfaces of the polygon mirror 110 on both the left and right sides respectively. However, the mixture preventing members of the present invention can also be applied to a scanning unit 100 that irradiates four laser beams obliquely onto a single reflecting surface of the polygon mirror.

(2) In the preferred embodiment described above, the mixture preventing members 160 are light-blocking members molded from synthetic resin, metal, or the like. However, the mixture preventing members 160 may also be formed of glass plates. In this case, the surface of the glass plate is coated to form a region that reflects a laser beam and a region that transmits a laser beam. By providing this mixture preventing member at a position that reflects only one laser beam while transmitting all other laser beams, it is possible to separate the optical paths of a plurality of laser beams and prevent the mixing of these laser beams. However, even when coating is applied to enhance transmittance, it is difficult to achieve zero reflectance. When using highly sensitive photosensitive members, even slight reflection may result in ghost images and the like. However, if the photosensitive members have low sensitivity, beams reflected off the transmitting region will not produce ghost images and the like. This method is particularly effective in such cases.

(3) Although not covered in detail in the preferred embodiment described above, a mechanism should be provided for adjusting the position of the mixture preventing members 160 (particularly the vertical position), because it is preferable to be able to finely adjust the positions of the mixture preventing members 160 when fine adjustments of the light-emitting units 180 and the like are performed.

The present invention can be applied to an image-forming device having a polygon mirror or other deflecting means with reflecting surfaces on which a plurality of laser beams are obliquely incident; a scanning unit provided in this image-forming device; and the like.

What is claimed is:

1. An image-forming device comprising:
   a polygon mirror rotatable about a rotational axis extending in a subscanning direction, the polygon mirror having a plurality of reflecting surfaces;
   a plurality of light sources that is aligned in the subscanning direction and irradiates a plurality of light beams onto one of the reflecting surfaces of the polygon mirror so as to be obliquely incident thereon;
   a plurality of optical reflecting systems each including at least one optical reflecting element, the optical reflecting systems being disposed in one-to-one correspondence with the light sources, thereby defining a plurality of optical paths for the light beams, each optical reflecting system receiving a light beam reflected off the one of the reflecting surfaces of the polygon mirror;
   a plurality of image-carrying portions on which the light beams traveling along corresponding optical paths form latent images by scanning the respective image-carrying portions; and
   one or a plurality of mixture preventing elements, each preventing a corresponding light beam from mixing in optical paths for another light beams.

2. The image-forming device according to claim 1, wherein each of the plurality of mixture preventing elements is disposed between the polygon mirror and the optical reflecting element disposed in an initial position in each of the plurality of optical systems.

3. The image-forming device according to claim 1, wherein the optical reflecting element disposed in an initial position in each of the plurality of optical systems comprises a mirror that reflects only the corresponding light beam.

4. The image-forming device according to claim 1, wherein each of the plurality of mixture preventing elements comprise a light-blocking member having an opening through which a single light beam passes, the opening being positioned such that the light beam passing through the opening does not enter the optical path corresponding to another light beam.

5. The image-forming device according to claim 4, wherein the opening has a first length in the subscanning direction and a second length in a main scanning direction orthogonal to the subscanning direction, the first length being substantially same over one scan line in the main scanning direction, and wherein each of the plurality of light-blocking members has a shape causing a beam spot diameter in the subscanning direction of the light beam upon reaching corresponding image-carrying member to be substantially same across one scan line worth in the main scanning direction.

6. The image-forming device according to claim 5, wherein each of the plurality of light-blocking members is a plate-shaped member having an opening elongated in the main scanning direction, and the first length of the opening differs between a center region and end regions in the main scanning direction.

7. The image-forming device according to claim 6, wherein the first length of the opening is such that the beam spot diameter in the subscanning direction of the light beam upon reaching the image-carrying member is substantially same across one scan line worth in the main scanning direction.

8. The image-forming device according to claim 1, wherein the plurality of optical systems is provided in one-to-one correspondence with the plurality of light sources.

9. The image-forming device according to claim 4, wherein openings corresponding to at least two light beams are provided in the same light-blocking member.

10. The image-forming device according to claim 4, further comprising a position adjusting mechanism that adjusts positions of the light-blocking members.

11. The image-forming device according to claim 1, wherein each mixture preventing member comprises a mirror having a region that reflects light beams and a region that transmits light beams and are positioned so that only one light beam is reflected while other light beams are transmitted.

12. The image-forming device according to claim 1, further comprising an fθ lens disposed between the one of the reflecting surfaces and the plurality of mixture preventing members through which the plurality of light beams pass.

13. An image-forming device for forming color images on a recording medium by superimposing a plurality of images, the device comprising:
   a plurality of image-carrying members each carrying a latent image corresponding to each color;
   a plurality of light sources that emits light beams to be scanned over the plurality of image-carrying members to form the latent images thereon;
   a polygon mirror that has a plurality of reflecting surfaces and deflects the plurality of light beams so that the light beams are scanned over the image-carrying members; and
   a plurality of optical reflecting systems each including at least one optical reflecting element and defining an optical path corresponding to each light beam;
   wherein two light beams are irradiated from different positions aligned in a subscanning direction to be obliquely incident on one reflecting surface of the polygon mirror, and after being deflected off the reflecting surface of the polygon mirror are guided to the respective image-carrying member via the optical path formed by the optical reflecting system, and wherein the image-forming device further comprises a plurality of mixture preventing members each disposed between the polygon mirror and each optical reflecting system for preventing light beams reflected off the reflecting surface of the polygon mirror from entering the optical path of another light beam.

14. The image-forming device according to claim 13, wherein four of the light sources and four of the image-carrying members are provided to correspond to the colors cyan, magenta, yellow, and black, the light source disposed two each on opposing sides of the polygon mirror so that two light beams emitted from the two light sources on each side of the polygon mirror are deflected by two different reflecting surfaces of the polygon mirror such that two light beams each are directed in opposing directions.

15. A scanning unit comprising:

a polygon mirror having a plurality of reflecting surfaces;

a plurality of light sources that irradiates a plurality of light beams from different positions with respect to a subscanning direction so as to be obliquely incident on the reflecting surfaces of the polygon mirror;

a plurality of optical reflecting systems having one or a plurality of optical reflecting elements that form optical paths for corresponding light beams reflected off the reflecting surfaces of the polygon mirror; and one or a plurality of mixture preventing members for preventing a light beam reflected off the reflecting surface of the polygon mirror from mixing with the optical reflecting systems of another light beam.

* * * * *